(12) United States Patent
Browne et al.

(10) Patent No.: US 9,003,789 B2
(45) Date of Patent: Apr. 14, 2015

(54) ENERGY HARVESTING SYSTEM

(75) Inventors: Alan L. Browne, Grosse Pointe, MI (US); Nancy L. Johnson, Northville, MI (US); Paul W. Alexander, Ypsilanti, MI (US); John Andrew Shaw, Dexter, MI (US); Christopher Burton Churchill, Ann Arbor, MI (US); Andrew C. Keefe, Encino, CA (US); Geoffrey P. McKnight, Los Angeles, CA (US); Guillermo A. Herrera, Winnetka, CA (US); Nilesh D. Mankame, Ann Arbor, MI (US); Richard J. Skurkis, Lake Orion, MI (US); Wayne Brown, Costa Mesa, CA (US)

(73) Assignees: GM Global Technology Operations LLC, Detroit, MI (US); Dynalloy, Inc., Tustin, CA (US); The Regents of the University of Michigan, Ann Arbor, MI (US)

( * ) Notice: Subject to any disclaimer, the term of this patent is extended or adjusted under 35 U.S.C. 154(b) by 191 days.

(21) Appl. No.: 13/340,886

(22) Filed: Dec. 30, 2011

(65) Prior Publication Data
US 2012/0216522 A1 Aug. 30, 2012

Related U.S. Application Data

(60) Provisional application No. 61/447,317, filed on Feb. 28, 2011, provisional application No. 61/447,315, filed on Feb. 28, 2011, provisional application No. 61/447,328, filed on Feb. 28, 2011, provisional application No. 61/447,321, filed on Feb. 28, 2011, provisional application No. 61/447,306, filed on Feb. 28, 2011, provisional application No. 61/447,324, filed on Feb. 28, 2011.

(51) Int. Cl.
*F01B 29/10* (2006.01)
*F02G 1/04* (2006.01)
*F03G 7/06* (2006.01)

(52) U.S. Cl.
CPC .................................. *F03G 7/065* (2013.01)

(58) Field of Classification Search
CPC ..................................................... F03G 7/065
USPC ........... 60/527–529, 530, 616, 618, 620, 721; 148/402, 421, 563; 420/902; 290/1 R; 310/306; 337/1, 140; 368/129, 137; 474/237, 239, 272
See application file for complete search history.

(56) References Cited

U.S. PATENT DOCUMENTS

| | | | | |
|---|---|---|---|---|
| 3,303,642 | A * | 2/1967 | Lee, II | 60/530 |
| 3,316,415 | A * | 4/1967 | Taylor | 290/1 R |
| 4,246,754 | A * | 1/1981 | Wayman | 60/527 |
| 4,275,561 | A * | 6/1981 | Wang | 60/527 |

(Continued)

*Primary Examiner* — Kenneth Bomberg
*Assistant Examiner* — Daniel Wagnitz
(74) *Attorney, Agent, or Firm* — Quinn Law Group, PLLC

(57) ABSTRACT

An energy harvesting system for converting thermal energy to mechanical energy includes a heat engine that operates using a shape memory alloy active material. The shape memory alloy member may be in thermal communication with a hot region at a first temperature and a cold region at a second temperature lower than the first temperature. The shape memory alloy material may be configured to selectively change crystallographic phase between martensite to austenite and thereby one of contract and expand in response to the first and second temperatures. A thermal conduction element may be in direct contact with the SMA material, where the thermal conduction element is configured to receive thermal energy from the hot region and to transfer a portion of the received thermal energy to the SMA material through conduction.

12 Claims, 4 Drawing Sheets

(56) References Cited

U.S. PATENT DOCUMENTS

| | | | |
|---|---|---|---|
| 4,305,250 A * | 12/1981 | Cory | 60/527 |
| 4,472,939 A * | 9/1984 | Wang | 60/527 |
| 4,965,545 A * | 10/1990 | Johnson | 337/140 |
| 5,419,788 A * | 5/1995 | Thoma et al. | 148/402 |
| 6,880,336 B2 * | 4/2005 | Howard | 60/527 |
| 7,527,425 B2 * | 5/2009 | Born | 368/131 |

* cited by examiner

ENERGY HARVESTING SYSTEM

CROSS-REFERENCE TO RELATED APPLICATIONS

This application claims the benefit of U.S. Provisional Application No. 61/447,317; U.S. Provisional Application No. 61/447,315; U.S. Provisional Application No. 61/447,328; U.S. Provisional Application No. 61/447,321; U.S. Provisional Application No. 61/447,306; and U.S. Provisional Application No. 61/447,324; all filed Feb. 28, 2011. All of which are hereby incorporated by reference in their entirety.

STATEMENT REGARDING FEDERALLY SPONSORED RESEARCH OR DEVELOPMENT

This invention was made with U.S. Government support under an Agreement/Project number: ARPA-E Contract number DE-AR0000040. The U.S. Government may have certain rights in this invention.

TECHNICAL FIELD

The present invention generally relates to energy harvesting systems, and more specifically, to shape-memory alloy heat engines.

BACKGROUND

Thermal energy is produced by many industrial, assembly, and manufacturing processes. Automobiles, small equipment, and heavy equipment also produce thermal energy. Some of this thermal energy is waste heat, which is heat produced by machines, electrical equipment, and industrial processes for which no useful application is found or planned, and is generally a waste by-product. Waste heat may originate from machines, such as electrical generators, or from industrial processes, such as steel, glass, or chemical production. The burning of transport fuels also contributes to waste heat.

SUMMARY

An energy harvesting system includes a heat engine, and a thermal conduction element in direct contact with the SMA material of the heat engine. The thermal conduction element may be configured to receive thermal energy from a hot region and transfer a portion of the received thermal energy to the SMA material through conduction. The heat engine may include a first rotatable pulley a second rotatable pulley spaced from the first rotatable pulley, and a shape memory alloy (SMA) material disposed about a portion of the first rotatable pulley at a first radial distance and about a portion of the second rotatable pulley at a second radial distance. The first and second radial distances may define an SMA pulley ratio. Additionally, a timing cable may be disposed about a portion of the first rotatable pulley at a third radial distance and about a portion of the second rotatable pulley at a fourth radial distance, where the third and fourth radial distances may define a timing pulley ratio that is different than the SMA pulley ratio.

The SMA material may be in thermal communication with a hot region at a first temperature and with a cold region at a second temperature lower than the first temperature. The SMA material may be configured to selectively change crystallographic phase between martensite to austenite and thereby one of contract and expand in response to exposure to the first temperature and also to one of expand and contract in response to exposure to the second temperature, thereby converting a thermal energy gradient between the hot region and the cold region into mechanical energy.

In one configuration, an electrical generator may be coupled with at least one of the first and second rotatable pulleys, and may be configured to convert rotational mechanical energy of the pulley into electrical energy.

The thermal conduction element may include a rotatable bushing disposed about a thermal exhaust pipe, or a rotatable portion of a thermal exhaust pipe itself. A gas may flow through the exhaust pipe, where the gas may generally have a temperature greater than or equal to the first temperature of the hot region. In another configuration, the thermal conduction element may include a rotatable heat transfer pulley having an outer SMA contact surface, and a convective heat transfer portion disposed radially inward from the SMA contact surface. The convective heat transfer portion of such a heat transfer pulley may include, for example, an impeller, or a plurality of heat transfer fins.

The above features and advantages and other features and advantages of the present invention are readily apparent from the following detailed description of the best modes for carrying out the invention when taken in connection with the accompanying drawings.

DETAILED DESCRIPTION

Figure 1:
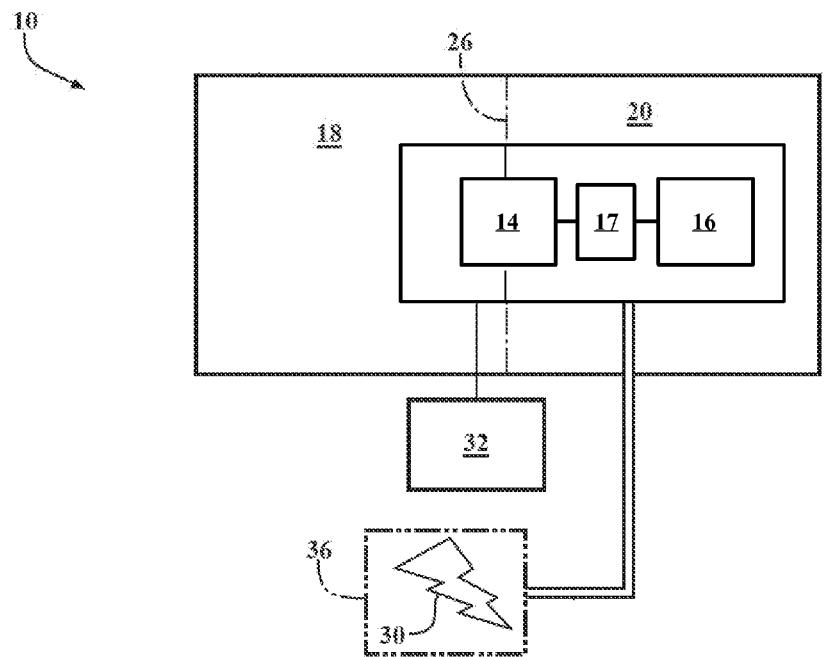
FIG. 1 is a schematic diagram of an energy harvesting system including a heat engine.

Referring to the drawings, wherein like reference numbers correspond to like or similar components whenever possible throughout the several figures, there is shown in FIG. 1 an energy harvesting system 10. Features and components shown and described in other figures may be incorporated and used with those shown in FIG. 1. The energy harvesting system 10 shown includes a heat engine 14, a driven component 16, and a coupling device 17 configured to selectively couple the driven component 16 with the heat engine 14.

The energy harvesting system 10 utilizes a first fluid region or a hot region 18, having a first temperature. The hot region 18 may be in heat transfer communication with a heat source, such as waste heat, or may represent any region of relatively warm temperature to contribute to operation of the heat engine 14, as described herein. The energy harvesting system 10 also utilizes a second fluid region or a cold region 20, having a second temperature, which is generally lower than the first temperature of the hot region 18. The cold region 20 may be in heat transfer communication with a cooling source, such as a cold fluid, or may represent any region of relatively cool temperature to contribute to operation of the heat engine 14, as described herein. The designation of the hot region 18 and the cold region 20, or the temperatures associated therewith as either "first" or "second" is arbitrary and is not limiting.

The heat engine 14, as described herein, is configured to convert thermal energy from the temperature differential between the hot region 18 and the cold region 20 into mechanical energy. The driven component 16 of the energy harvesting system 10 may be configured to be driven by the mechanical energy or power generated from the conversion of thermal energy to mechanical energy within the heat engine 14.

The driven component 16 may be a mechanical device, such as, without limitation: a generator, a fan, a clutch, a blower, a pump, a compressor, and combinations thereof. It should be appreciated that the driven component 16 is not limited to these devices, as any other device known to those skilled in the art may also be used. The driven component 16 may be operatively connected to the heat engine 14 such that the driven component 16 is driven by the heat engine 14.

More specifically, the driven component 16 may be part of an existing system, such as a heating or cooling system and the like. Driving the driven component 16 with mechanical energy provided by the heat engine 14 may also allow an associated existing system within the energy harvesting system 10 to be decreased in size and/or capacity or eliminated entirely.

Additionally, the mechanical energy produced by the energy harvesting system 10 may be stored for later use or as an auxiliary energy supply. In vehicles or power production facilities, the energy harvesting system 10 increases the overall efficiency of the vehicle or production facility by converting what may have been waste thermal energy into energy for current or later use such as stored rotational kinetic energy in a flywheel.

The driven component 16 may be a generator or an electric machine (which may be referred to as a motor/generator) configured to convert the mechanical energy from the heat engine 14 into electricity 30 (as schematically shown in FIG. 1). Alternatively, the driven component 16 may attached to, or in communication with, a generator. The driven component 16 may be any suitable device configured to convert mechanical energy to electricity 30. For example, the driven component 16 may be an electric machine that converts mechanical energy to electricity 30 using electromagnetic induction. The driven component 16 may include a rotor (not shown) that rotates with respect to a stator (not shown) to generate electricity 30. The electricity 30 generated by the driven component 16 may then be used to assist in powering one or more electric systems or may be stored in an energy storage device.

The hot region 18 and the cold region 20 may be sufficiently spaced from one another to maintain the temperature differential between the two, or may be separated by a sufficient heat exchange barrier 26, including, without limitation: a heat shield, a Peltier device, or an insulating barrier. The heat exchange barrier 26 may be employed to separate the heat engine 14 into the hot region 18 and the cold region 20 such that a desired temperature differential between the hot region 18 and the cold region 20 is achieved. When the heat exchange barrier 26 disposed between the hot region 18 and the cold region 20 is a Peltier device, such as a thermoelectric heat pump, the heat exchange barrier 26 is configured to generate heat on one side of the barrier 26 and to cool on an opposing side of the barrier 26.

The hot region 18 and the cold region 20 of the energy harvesting system 10 may be filled with, for example and without limitation: gas, liquid, or combinations thereof. Alternatively, the hot region 18 and the cold region 20 may represent contact zones or contact elements configured for conductive heat transfer with the heat engine 14.

The heat engine 14 is configured to utilize temperature differentials/gradients between the hot region 18 and the cold region 20 in the energy harvesting system 10 in areas such as, without limitation: vehicular heat and waste heat, power generation heat and waste heat, industrial waste heat such as liquids used as coolants in machining, air conditioning, exhaust stack scrubbers, nuclear power plant cooling towers, and foundaries as examples, residential and commercial building heat sources such as clothes dryers, stoves (exhaust vents), water heater exhaust, geothermal heating and cooling sources, solar heat (directly as radiation or indirectly such as the heated coolant in solar cell arrays, solar heated materials such as asphalt), heat from combustion sources including camp fires and grilles, and waste heat, and combinations thereof. It should be appreciated that the energy harvesting system 10 may be configured to utilize temperature differentials in numerous other areas and industries.

Figure 2:
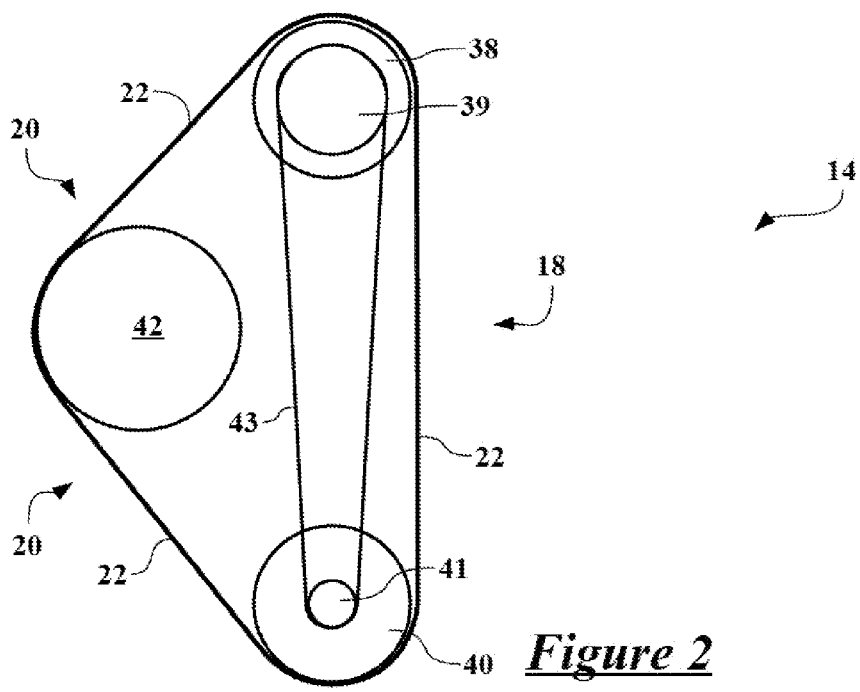
FIG. 2 is a schematic side view of the heat engine of FIG. 1.
Figure 3:
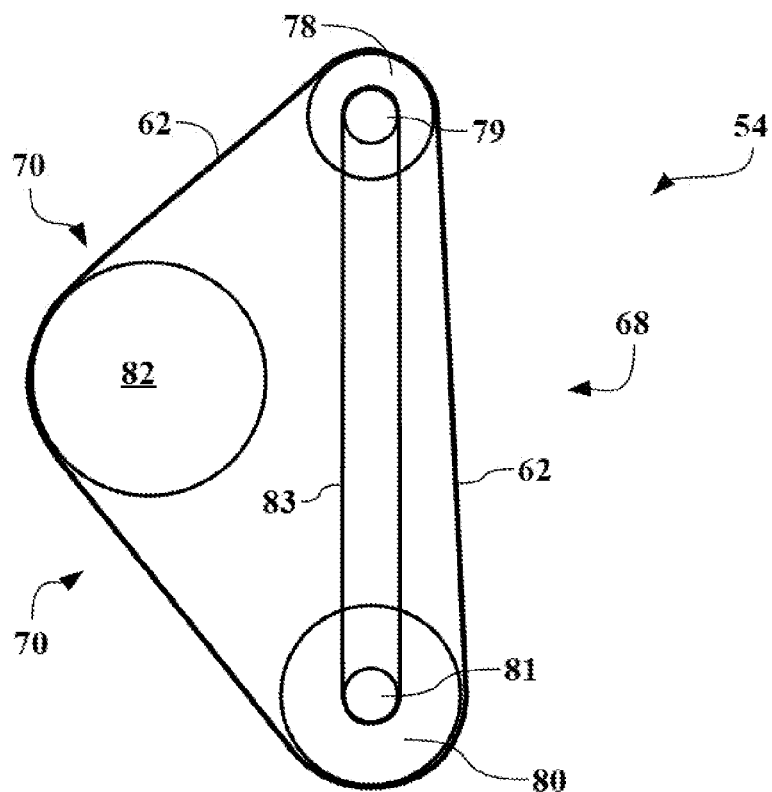
FIG. 3 is a schematic side view of another heat engine usable with the energy harvesting system of FIG. 1.

Referring now to FIG. 2, and with continued reference to FIG. 1, there is shown a more-detailed schematic view of the heat engine 14 shown in FIG. 1. Other types and configurations of heat engines may be used with the heat recovery system 10 shown in FIG. 1. FIG. 3 shows another heat engine 54 which may also be used with the heat recovery system 10 shown in FIG. 1, and includes many similar components and functions similarly to the heat engine 14.

The heat engine 14 of FIG. 2 includes a shape memory alloy material 22 and is operatively disposed in, or in heat-exchange communication with, the hot region 18 and the cold region 20. In the configuration shown, the hot region 18 may be adjacent to a heat exhaust pipe and the cold region 20 may be placed in ambient air or in the path of moving, relatively cool, air from fans or blowers.

The heat engine 14 also includes a first member or first pulley 38 and a second member or second pulley 40. The first pulley 38 and the second pulley 40 may also be referred to as drive pulleys. The heat engine 14 also includes an idler pulley 42, which adds travel to the path of the shape memory alloy material 22 and may additionally be configured to variably add tension (or take up slack) to the shape memory alloy material 22.

In this configuration, the first pulley 38 and the second pulley 40 are disposed between the hot region 18 and the cold region 20. However, the heat engine may be configured with the first pulley operatively disposed in the hot region 18 and the second pulley 40 operatively disposed in the cold region 20, or the reverse. The idler pulley 42 may likewise be disposed in the cold region 20.

The heat engine 14 further includes two timing members, a first timing pulley 39 and a second timing pulley 41, which are fixed to the first pulley 38 and the second pulley 40, respectively. The first timing pulley 39 and the second timing pulley 41 provide a mechanical coupling between the first pulley 38 and the second pulley 40 (the two drive pulleys) such that rotation of either drive pulley ensures the rotation of the other in the same direction.

The first timing pulley 39 and the second timing pulley 41 are linked by a timing chain or timing belt 43. Alternatively, a timing mechanism such as sprockets linked with a chain or meshed gears may also be used to provide a mechanical coupling between the first pulley 38 and the second pulley 40. As may be appreciated, other synchronizing means may be employed to accomplish the same or similar function. Inclusion of the mechanical coupling provided by the timing chain 43 (in addition to the shape memory alloy material 22) between the first pulley 38 and the second pulley 40, means that the heat engine 14 may be referred to as a synchronized heat engine.

In one configuration, the first pulley 38 and first timing pulley 39 may be integrated into a single pulley, whereby the SMA material 22 may be maintained at a first radial distance, and the timing cable 43 may be maintained at a second radial distance. Likewise, the second pulley 40 and second timing pulley 41 may be integrated into a single pulley, whereby the SMA material 22 may be maintained at a third radial distance, and the timing cable 43 may be maintained at a fourth radial distance. The first and third distances may define an SMA pulley ratio, and the second and fourth distances may define a timing pulley ratio, which may be different than the SMA pulley ratio.

In the embodiment shown in FIG. 2, the first timing pulley 39 is larger in diameter than the second timing pulley 41. However, in the embodiment shown in FIG. 3, the timing pulleys are substantially the same size but a first pulley 78 is larger in diameter than a second pulley 80. The difference in diameter alters the reactive torque or moment arm provided by the respectively pulley members. Different moment arms about the pulleys (i.e. differences in pulley ratios) cause a resultant torque to be generated from the contraction forces, as explained herein, along the shape memory alloy material 22 adjacent the hot region 18.

The heat engine 14 is configured to convert thermal energy to mechanical energy and, with the help of the driven component 16, convert mechanical energy to electrical energy. More specifically, the energy harvesting system 10 utilizes a temperature differential between the hot region 18 and the cold region 20 to generate mechanical and/or electrical energy via the shape memory alloy material 22, as explained in more detail below. The mechanical and electrical energy created from available thermal energy may be used or stored, as opposed to allowing the thermal energy to dissipate.

The shape memory alloy material 22 is disposed in thermal contact, or heat-exchange communication, with each of the hot region 18 and the cold region 20. The shape memory alloy material 22 of the heat engine 14 has a crystallographic phase changeable between austenite and martensite in response to exposure to the first and second temperatures of the hot region 18 and the cold region 20.

As used herein, the terminology "shape memory alloy" (often abbreviated as "SMA") refers to alloys which exhibit a shape memory effect. That is, the shape memory alloy material 22 may undergo a solid state, crystallographic phase change via molecular rearrangement to shift between a martensite phase, i.e., "martensite", and an austenite phase, i.e., "austenite." Alternatively stated, the shape memory alloy material 22 may undergo a displacive transformation rather than a diffusional transformation to shift between martensite and austenite. A displacive transformation is a structural change that occurs by the coordinated movement of atoms (or groups of atoms) relative to their neighbors. In general, the martensite phase refers to the comparatively lower-temperature lower modulus phase and is often more deformable than the comparatively higher-temperature higher modulus austenite phase.

The temperature at which the shape memory alloy material 22 begins to change from the austenite phase to the martensite phase is known as the martensite start temperature, $M_s$. The temperature at which the shape memory alloy material 22 completes the change from the austenite phase to the martensite phase is known as the martensite finish temperature, $M_f$. Similarly, as the shape memory alloy material 22 is heated, the temperature at which the shape memory alloy material 22 begins to change from the martensite phase to the austenite phase is known as the austenite start temperature, $A_s$. The temperature at which the shape memory alloy material 22 completes the change from the martensite phase to the austenite phase is known as the austenite finish temperature, $A_f$.

Therefore, the shape memory alloy material 22 may be characterized by a cold state, i.e., when a temperature of the shape memory alloy material 22 is below the martensite finish temperature $M_f$ of the shape memory alloy material 22. Likewise, the shape memory alloy material 22 may also be characterized by a hot state, i.e., when the temperature of the shape memory alloy material 22 is above the austenite finish temperature $A_f$ of the shape memory alloy material 22.

In operation, shape memory alloy material 22 that is pre-strained or subjected to tensile stress can change dimension upon changing crystallographic phase to thereby convert thermal energy to mechanical energy. That is, the shape memory alloy material 22 may change crystallographic phase from low modulus martensite to high modulus austenite and thereby dimensionally contract if pseudoplastically pre-strained so as to convert thermal energy to mechanical energy. Conversely, the shape memory alloy material 22 may change crystallographic phase from high modulus austenite to low modulus martensite and if under stress thereby dimensionally stretch so as to also convert thermal energy to mechanical energy.

Pseudoplastically pre-strained refers to stretching of the shape memory alloy material 22 while in the low modulus martensite phase so that the strain exhibited by the shape memory alloy material 22 under that loading condition is not fully recovered when unloaded, where purely elastic strain would be fully recovered. In the case of the shape memory alloy material 22, it is possible to load the material such that the elastic strain limit is surpassed and deformation takes place in the martensitic crystal structure of the material prior to exceeding the true plastic strain limit of the material. Strain of this type, between those two limits, is pseudoplastic strain, called such because upon unloading it appears to have plastically deformed. However, when heated to the point that the shape memory alloy material 22 transforms to its austenite phase, that strain can be recovered, returning the shape memory alloy material 22 to the original length observed prior to application of the load.

The shape memory alloy material 22 may be stretched in the low temperature martensite phase before installation into the heat engine 14, such that a nominal length of the shape memory alloy material 22 includes recoverable pseudoplastic strain. Alternating between the pseudoplastic deformation state (relatively long length) and the fully-recovered austenite phase (relatively short length) provides the motion used for actuating or driving the heat engine 14. Without pre-stretching the shape memory alloy material 22, little deformation would be seen during phase transformation.

The shape memory alloy material 22 may change both modulus and dimension upon changing crystallographic phase to thereby convert thermal energy to mechanical energy. More specifically, the shape memory alloy material 22, if pseudoplastically pre-strained, may dimensionally contract upon changing crystallographic phase from martensite to austenite and may dimensionally stretch, if under tensile stress, upon changing crystallographic phase from austenite to martensite to thereby convert thermal energy to mechanical energy. Therefore, when a temperature differential exists between the first temperature of the hot region 18 and the second temperature of the cold region 20, i.e., when the hot region 18 and the cold region 20 are not in thermal equilibrium, respective localized regions of the shape memory alloy material 22 disposed within the hot region 18 and the cold region 20 may respectively dimensionally stretch and contract upon changing crystallographic phase between martensite and austenite.

The shape memory alloy material 22 may have any suitable composition. In particular, the shape memory alloy material 22 may include an element selected from the group including, without limitation: cobalt, nickel, titanium, indium, manganese, iron, palladium, zinc, copper, silver, gold, cadmium, tin, silicon, platinum, gallium, and combinations thereof. For example, and without limitation, suitable shape memory alloys 22 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof.

The shape memory alloy material 22 can be binary, ternary, or any higher order so long as the shape memory alloy material 22 exhibits a shape memory effect, i.e., a change in shape orientation, damping capacity, and the like. The specific shape memory alloy material 22 may be selected according to desired operating temperatures of the hot region 18 and the cold region 20, as set forth in more detail below. In one specific example, the shape memory alloy material 22 may include nickel and titanium.

As shown FIG. 1, the energy harvesting system 10 may include a control system 32 that is configured to monitor the first and second temperature of the fluid in the hot region 18 and the cold region 20, respectively. The control system 32 may be operatively connected to any of the components of the energy harvesting system 10.

The control system 32 may be a computer that electronically communicates with one or more controls and/or sensors of the energy harvesting system 10. For example, the control system 32 may communicate with temperature sensors within the hot region 18 and the cold region 20, a speed regulator of the driven component 16, fluid flow sensors, and/or meters configured for monitoring electricity 30 generation of the driven component 16.

Additionally, the control system 32 may be configured to control the harvesting of energy under predetermined conditions of the energy harvesting system 10, e.g., after the energy harvesting system 10 has operated for a sufficient period of time such that a temperature differential between the hot region 18 and the cold region 20 is at a sufficient, or an optimal, differential. Other predetermined conditions of the energy harvesting system 10 may also be used. The control system 32 may also be configured to provide an option to manually override the heat engine 14 and allow the energy harvesting system 10 to effectively be turned off, such as when the thermal energy supplying the hot region 18 is needed elsewhere and should not be converted into other forms of energy by the heat engine 14. A clutch (not shown) may also be controlled by the control system 32 to selectively disengage the heat engine 14 from the driven component 16.

The electricity 30 from the driven component 16 may be communicated to a storage device 36, which may be, without limitation, a battery, battery pack, or another energy storage device. The storage device 36 may be located proximate to, but physically separate from, the energy harvesting system 10.

For any of the examples discussed herein, the energy harvesting system 10 may include a plurality of heat engines 14 and/or a plurality of driven components 16. Likewise, the energy harvesting system 10 may be coupled or operated in conjunction with additional energy harvesting systems 10, where each energy harvesting system 10 includes at least one heat engine 14 and at least one driven component 16. The use of multiple heat engines 14 may take advantage of multiple regions of temperature differentials throughout the energy harvesting system 10.

Referring again to FIG. 2, the first pulley 38 and the second pulley 40 may also be, without limitation: a gear, a one-way clutch, or a spring. A one-way clutch may be configured to allow rotation of the first pulley 38 and the second pulley 40 in only one direction.

The first pulley 38, the second pulley 40, or the idler pulley 42 is operatively connected to the driven component 16 such that rotation—as a result of the combined modulus and dimensional changes of the shape memory alloy material 22—drives the driven component 16. Furthermore, each of the pulley members may be connected to the driven component 16, or may feed into a transmission or gear system before transferring mechanical energy to the driven member 16. Although three rotational members are shown in FIG. 2, it should be appreciated that more or fewer members may be used.

As described herein, the shape memory alloy material 22 may be embedded within a belt or cable. Furthermore, the shape memory alloy material 22 may be configured as a longitudinally extending wire that is embedded within the belt such that the belt longitudinally stretches and contracts as a function of the associated shape memory alloy material 22 also stretching and contracting. Additionally, or alternatively, the shape memory alloy material 22 may be configured as one or more helical springs that may be embedded within the belt. The shape memory alloy material 22 may be a wire that has any desired cross-sectional shape, i.e., round, rectangular, octagonal, ribbon, or any other shape known to those skilled in the art. Additionally, the belt may be at least partially formed from a resilient material. For example, the resilient material may be an elastomer, a polymer, combinations thereof, and the like. The belt may be formed as a continuous loop, as shown in FIGS. 2 and 3, or as an elongated strip.

In operation of the heat engine 14 shown in FIG. 2, a localized region of the shape memory alloy member 22 may be disposed within, or directly adjacent to, the hot region 18 such that the first temperature causes that corresponding localized region of the shape memory alloy material 22 to longitudinally contract as a function of the first temperature of the hot region 18. Similarly, another localized region of the shape memory alloy material 22 may be similarly disposed within, or adjacent to, the cold region 20 such that the second temperature causes that localized region of the shape memory alloy material 22 to longitudinally stretch as a function of the second temperature of the cold region 20.

For example, if the first temperature of the hot region 18 is at or above the hot state, the associated localized region of the shape memory alloy material 22 will longitudinally contract as a result of a phase change of the shape memory alloy material 22 from the martensite phase to the austenite phase. Similarly, if the second temperature of the cold region 20 is below the cold state, the associated localized region of the shape memory alloy material 22 will longitudinally stretch (due to the tension in the element) as a result of a phase change of the shape memory alloy material 22 from the higher modulus austenite phase to the lower modulus martensite phase.

The shape memory alloy member 22 may be continuously looped about the first pulley 38 and the second pulley 40 such that motion imparted from the shape memory alloy member 22 causes rotation of each of the first pulley 38 and the second pulley 40 (and also the idler pulley 42). The longitudinal expansion (stretching) and/or contraction of the localized regions of the shape memory alloy material 22 impart motion from the shape memory alloy member 22 to the first pulley 38 and the second pulley 40 to move or drive the driven component 16. The localized regions are those portions of the shape memory alloy member 22 that are in the respective hot region 18 and the cold region 20 at any given moment.

As shown in the heat engine 14 of FIG. 2, when the shape memory alloy member 22 contracts after being heated by the hot region 18, the first timing pulley 39 provides a larger reactive torque than the second timing pulley 41. Therefore, the contraction of the shape memory alloy member 22 between the first pulley 38 and the second pulley 40 (which rotate in common with the first timing pulley 39 and the second timing pulley 41, respectively) causes the shape memory alloy member 22 to move toward the first pulley 38. As the heat engine 14 enters dynamic operation, the shape memory alloy member 22, the first pulley 38, and the second pulley 40 rotate counterclockwise (as viewed in FIG. 2).

The heat engine 14 does not require liquid baths for the hot region 18 and the cold region 20. Therefore, significant portions of the heat engine 14 and the shape memory allow member 22 are not required to be submersed in liquids.

Referring now to FIG. 3, and with continued reference to FIGS. 1 and 2, there is shown another heat engine 54, which may also be incorporated and used with the heat recovery system 10 shown in FIG. 1. Features and components shown and described in other figures may be incorporated and used with those shown in FIG. 2. The heat engine 54 is disposed in heat-exchange communication with a hot region 58 and a cold region 60. The heat engine 54 includes a shape memory alloy member 62 traveling a continuous loop around a first pulley 78, a second pulley 80, and an idler pulley 82.

A first timing pulley 79 and a second timing pulley 81 are mechanically coupled by a timing chain 83. Inclusion of the mechanical coupling provided by the timing chain 83 (in addition to the shape memory alloy member 62) between the first pulley 78 and the second pulley 80, means that the heat engine 54 may also be referred to as a synchronized heat engine.

Unlike the heat engine 14 shown in FIG. 2, in the heat engine 54 of FIG. 3, the first timing pulley 79 and the second timing pulley 81 are substantially equal in diameter. In one configuration, the first and second timing pulleys 79, 81 may be the respective axles of the first and second pulleys 78, 80. In the heat engine 54, the second pulley 80 has a larger diameter than the first pulley 78.

As shown in the heat engine 54 of FIG. 3, when the shape memory alloy member 62 contracts after being heated by the hot region 58, the second pulley 80 creates a larger moment arm than the first pulley 78. However, the first timing pulley 79 and the second timing pulley 81 provide equal reaction torque. Therefore, the contraction of the shape memory alloy member 62 between the first pulley 78 and the second pulley 80 causes the shape memory alloy member 62 to again move toward the first pulley 78. As the heat engine 54 enters dynamic operation, the shape memory alloy member 62, the first pulley 78, and the second pulley 80 rotate counterclockwise (as viewed in FIG. 3).

Figure 4:
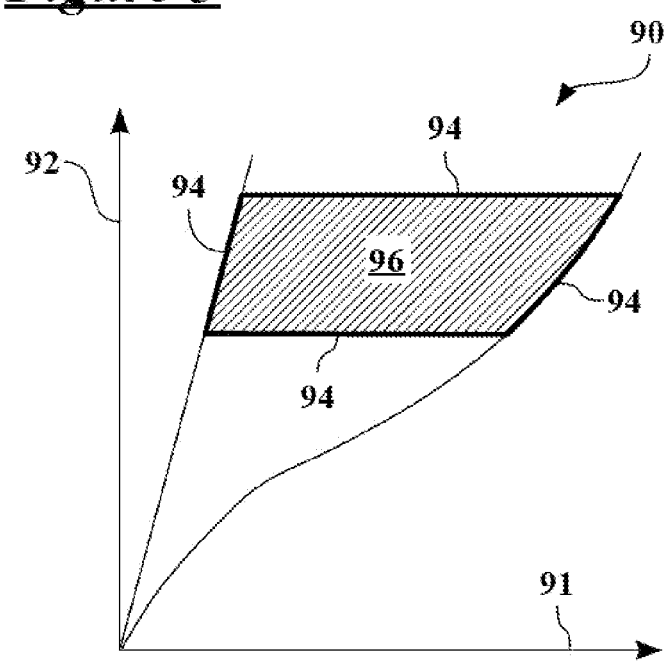
FIG. 4 is a schematic graphical representation of a work diagram for a heat engine, such as those shown in either FIG. 2 or FIG. 3.

Referring now to FIG. 4, and with continued reference to FIGS. 1-3, there is shown a schematic graphical representation of a work diagram 90. An x-axis 91 of the work diagram 90 shows the length of the shape memory alloy member 22 shown in FIG. 2, the shape memory alloy member 62 shown in FIG. 3, or another SMA working member incorporated into a heat engine, such as the heat engine 14 or the heat engine 54. A y-axis 92 of the work diagram 90 shows the tension force of the shape memory alloy member 22 shown in FIG. 2, the shape memory alloy member 62 shown in FIG. 3, or another SMA working member.

The work diagram 90 shows a work path 94 following a location or region of the shape memory alloy member 22 or the shape memory alloy member 62 as it loops during operation of the heat engine 14 or the heat engine 54. Application of a force over a displacement (i.e., a change in length) requires work to be done. A net work zone 96 represents the net work effected by the shape memory alloy member 22 or the shape memory alloy member 62 on each loop. Therefore, the fact that the net work zone 96 is greater than zero shows that the shape memory alloy member 22 or the shape memory alloy member 62 is producing mechanical work from the thermal energy available to the heat engine 14 or the heat engine 54.

Figure 5:
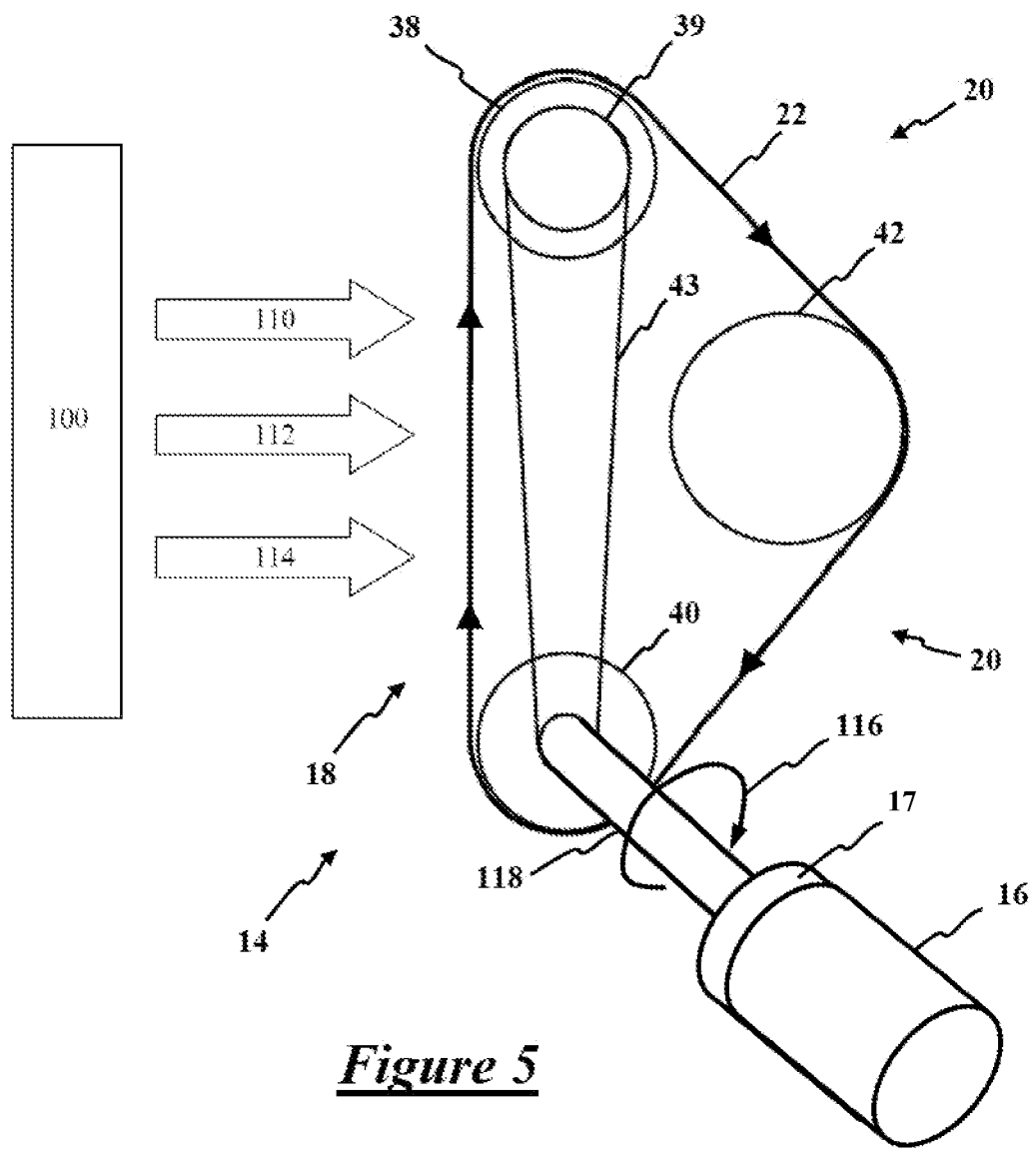
FIG. 5 is a schematic side view of the heat engine of FIG. 1, configured to receive thermal energy from a source and produce a mechanical output.

As schematically illustrated in FIG. 5, the heat engine 14 may be in thermal communication with a heat source 100 that is disposed adjacent or within the hot region 18. As generally described above, the heat source 100 may be any suitable element or device that is capable of transferring thermal energy into the shape memory alloy 22. Preferably, the heat source 100 may be configured to transfer a sufficient amount of thermal energy to the SMA 22 to achieve an austenitic phase transformation within the hot region 18. As generally shown, the thermal heat transfer may occur via one or more transfer mechanisms, such as conduction 110, convection 112, or radiation 114. As generally described above, this thermal energy from the heat source may impart a motion of the SMA 22, which may be captured as a rotation/torque 116 of an output shaft 118. In an embodiment, the output shaft 118 may be geared or coupled through a transmission 17 to a driven component 16. The transmission 17 may allow the heat engine to better match the output power demands based on the torque 116 that may be available.

Figure 6:
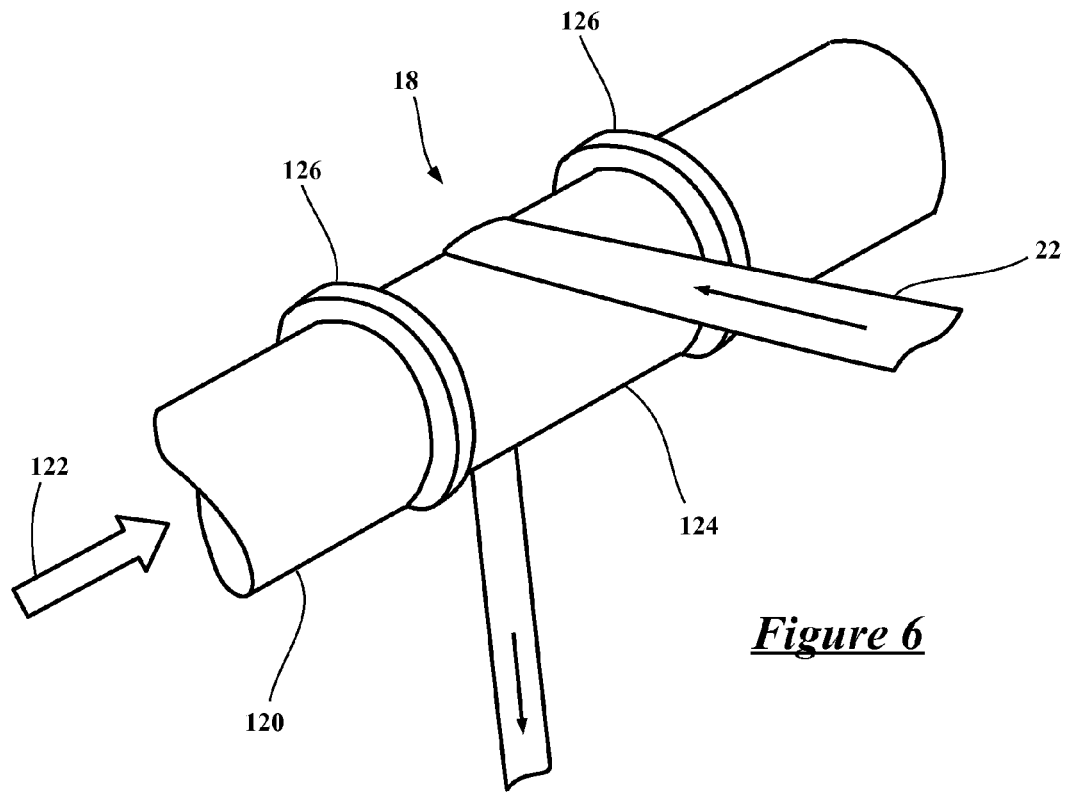
FIG. 6 is a schematic perspective view of a internal combustion engine exhaust pipe having a rotating section configured to conduct heat to a shape memory alloy belt.

While the present energy harvesting system may be readily adapted to operate with any heat source, particular uses may focus on scavenging thermal energy that would otherwise be exhausted into the environment. For example, in an automotive context, as generally illustrated in FIG. 6, the heat source 100 may be an exhaust manifold/pipe 120 that carries hot exhaust gasses 122 away from the engine. Similarly, in many industrial contexts, heat may be generated as a by-product of various manufacturing processes. While such industrial heat is normally exhausted through a smokestack or liquid cooled radiator, the present energy harvesting system may be used to reclaim this waste energy as work.

Referring back to FIG. 5, conductive heat transfer 110 may be accomplished, for example, by bringing the SMA into direct contact with hot liquids, such as factory cooling liquids, fluid in cooling towers or nuclear power plants, liquid that is heated through solar heating, geothermal waters, and/or other liquids such as in oceans, lakes, or wells. In an embodiment, the hot liquids may be free-flowing liquids rather than liquids in a sealed vessel—thus promoting a greater, and more consistent heat exchange. Alternatively, conductive heat transfer 110 may be accomplished through direct contact with hot geothermal materials, such as sand, or hot exhaust manifolds/pipes (as shown in FIG. 6), brushes, wipers, or other similar contacts.

As generally illustrated in FIG. 6, conductive heat transfer 110 may further be accomplished if the SMA belt 22 is placed in direct contact with a thermal conduction element, such as a portion of an exhaust pipe 120, or a bushing disposed around the pipe 120. The thermal conduction element is configured to receive thermal energy from the hot region 18 and may transfer a portion of the received thermal energy to the SMA belt 22 through conduction. In one configuration, a section 124 of the pipe may be configured to rotate to aid in the heat engine operation. Such a section 124 may be joined with the non-rotating portion through a plurality of bearings 126, and may be generally placed within the hot region 18. In one configuration, the rotating section 124 or bushing may receive thermal energy from hot gasses 122 flowing within the pipe 120 that may be at a temperature greater than or equal to the temperature of the rotatable bushing/section 124. The section 124 may be either a pulley 40, 80, as shown in FIGS. 2 and 3, respectively, or may be merely an idler pulley disposed along a length of the SMA 22 within the hot region 18.

In one configuration, multiple conductive pulleys may be used within the hot region 18, where the SMA element 22 weaves between the various pulleys for maximized direct contact. To further enhance the contact, the pulleys may be coated with elements to reduce the thermal-resistance between each respective pulley and the SMA element 22. Such coatings may include, for example, oils, rosins, or brush-like surface textures.

Figure 7:
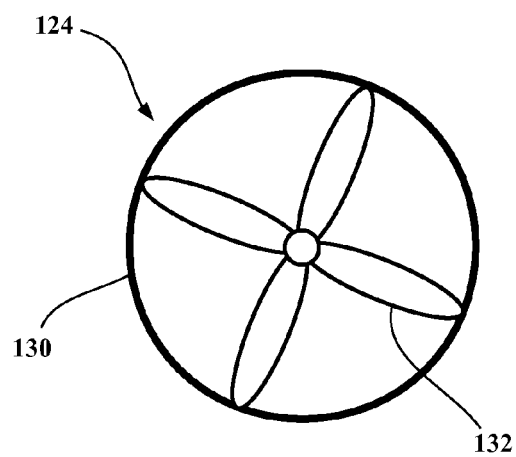
FIG. 7 is a schematic cross-sectional view of a thermal conductive element, such as a rotatable pulley, that includes an impeller radially interior to an SMA contact surface.
Figure 8:
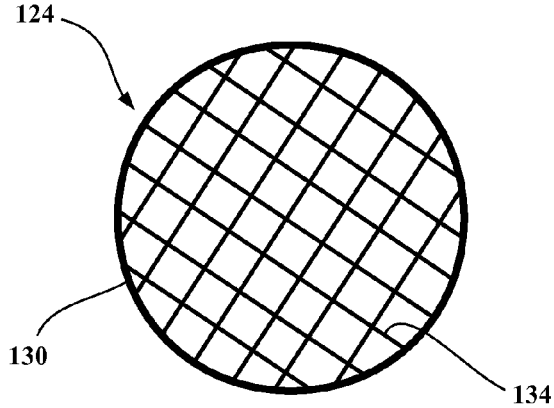
FIG. 8 is a schematic cross-sectional view of a thermal conductive element, such as a rotatable pulley, that includes heat transfer fins radially interior to an SMA contact surface.

To promote heat transfer out of the various thermal conduction elements, each pulley/rotating section 124 may have an outer SMA contact surface 130, and a convective heat transfer portion disposed radially inward from the SMA contact surface. For example, as generally illustrated in FIG. 7, the pulley/rotating section 124 may have a radially interior impeller portion 132, (i.e., interior to the radially outward SMA contact surface 130) that may promote enhanced convection between any laterally flowing air and the pulley itself. Alternatively, as illustrated in FIG. 8, each pulley/rotating section 124 may have one or more thermally conductive heat transfer fins 134 to promote heat transfer from the flowing air to the outer contact surface 130. Additionally, to promote a greater surface contact between the pulley and the SMA element 22, in an embodiment, the pulley may have a partially compliant surface for receiving the SMA element.

Referring again to FIG. 5, examples of convective heat transfer 112 may include thermal heating via naturally occurring air temperature gradients (such as generally shown in FIG. 7), or through combustion produced air temperature gradients (e.g., via an internal combustion engine, diesel combustion engine, incinerator, camp fire, furnace, etc. . . . ). Finally, examples of radiation-based heat transfer 114 may include solar heating, or heating via the radiation of combustion.

Once motion of the SMA 22 is imparted by the environmental temperature gradient, the heat engine 14 may be operative to rotate a drive shaft 118. The rotation/torque 116 of this shaft may be imparted to a driven component 16, and/or through one or more gear systems/coupling devices 17. In an embodiment, as described above, the driven component 16 may be a generator that may convert the rotational shaft-motion into electricity. The outputted electricity may be stored for later use (such as in a battery), or may be used to power one or more devices. In an automotive context, the electricity may be used to power various vehicle accessories, power user appliances, or re-charge small devices such as cellular telephone batteries.

In another embodiment, the rotation/torque 116 of the drive shaft 118 may be directly used to power various mechanical components. For example, the output shaft 118 may directly drive a ceiling fan in a house. Alternatively, the rotation of the drive shaft may be used with a self-pumping heat pipe, a self-running heat pump, or air/fluid pump. For example, in an automotive context, the output shaft 118 may drive an air conditioning compressor or fan. Likewise, in a geothermal arrangement, the output shaft 118 may be coupled with a well pump to transport subterranean water to the surface for human use, or may be used in irrigation applications, and/or in low lying areas such as polders.

In another embodiment, the power take off point can be switching between the pulleys dependent on the nature of the application: larger pulley for low speed high torque, smaller pulley for high speed low torque.

In another embodiment, the looping movement of the active element, for example in spring or other geometric form can be used to transport heat through a combination of the enthalpy of phase transformation and the specific heat of the material from a hot to a cooler region for either heating the cooler region or cooling the hotter region i.e. as a heat exchanger.

In another embodiment, the looping movement of the active element can be used to stir liquids, granular materials, etc. in which a temperature gradient exists.

While many approaches to a heat engine design have been outlined herein, they may each, either independently or collectively be used to improve the heat transfer rate or efficiency of a shape memory alloy heat engine or to improve its controllability. Therefore, no one approach should be considered limiting or exclusive, as many or all embodiments may be used collectively or in combination. While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. An energy harvesting system comprising:
   a heat engine including:
   a first rotatable pulley;
   a second rotatable pulley spaced from the first rotatable pulley;
   a shape memory alloy (SMA) material disposed about a portion the first rotatable pulley at a first radial distance and about a portion of the second rotatable pulley at a second radial distance, the first and second radial distances defining an SMA pulley ratio;
   a timing cable disposed about a portion the first rotatable pulley at a third radial distance and about a portion of the second rotatable pulley at a fourth radial distance, the third and fourth radial distances defining a timing pulley ratio, the timing pulley ratio being different than the SMA pulley ratio;
   wherein the SMA material is configured to be placed in thermal communication with a hot region at a first temperature and with a cold region at a second temperature lower than the first temperature; and
   wherein the SMA material is configured to selectively change crystallographic phase between martensite and austenite to thereby convert a thermal energy gradient between the hot region and the cold region into mechanical energy;
   a thermal conduction element in direct contact with the SMA material of the heat engine, the thermal conduction element configured to receive thermal energy from the hot region and to transfer a portion of the received thermal energy to the SMA material through conduction; and wherein the thermal conduction element includes a rotatable section of a thermal exhaust pipe; and wherein the rotatable section is one of the first rotatable pulley, the second rotatable pulley and an idler pulley.

2. The energy harvesting system of claim 1, wherein the thermal conduction element includes a rotatable heat transfer pulley having an outer SMA contact surface, and a convective heat transfer portion disposed radially inward from the SMA contact surface.

3. The energy harvesting system of claim 2, wherein the convective heat transfer portion of the heat transfer pulley includes an impeller.

4. The energy harvesting system of claim 2, wherein the convective heat transfer portion of the heat transfer pulley includes a plurality of heat transfer fins.

5. The energy harvesting system of claim 1, further comprising the idler pulley in mechanical communication with the SMA material and configured to receive thermal energy from the SMA material through conduction and to convey a portion of the received thermal energy to the cold region.

6. The energy harvesting system of claim 5, wherein the idler pulley is configured to impart a minimal tension to the SMA material.

7. The energy harvesting system of claim 1, further comprising an electrical generator coupled with at least one of the first rotatable pulley and second rotatable pulley, the electrical generator configured to convert rotational mechanical energy of the pulley into electrical energy.

8. An energy harvesting system comprising:
a heat engine including:
    a first rotatable pulley;
    a second rotatable pulley spaced from the first rotatable pulley;
    a shape memory alloy (SMA) material disposed about a portion the first rotatable pulley at a first radial distance and about a portion of the second rotatable pulley at a second radial distance, the first and second radial distances defining an SMA pulley ratio;
    a timing cable disposed about a portion the first rotatable pulley at a third radial distance and about a portion of the second rotatable pulley at a fourth radial distance, the third and fourth radial distances defining a timing pulley ratio, the timing pulley ratio being different than the SMA pulley ratio;
wherein the SMA material is configured to be placed in thermal communication with a hot region at a first temperature and with a cold region at a second temperature lower than the first temperature; and
wherein the SMA material is configured to selectively change crystallographic phase between martensite and austenite to thereby convert a thermal energy gradient between the hot region and the cold region into mechanical energy;
an exhaust pipe in mechanical communication with the SMA material, the exhaust pipe at the first temperature, and wherein the exhaust pipe is configured to transfer thermal energy to the SMA material through conduction; and
wherein the exhaust pipe includes a rotatable section, and wherein the SMA material is in direct contact with the rotatable section; and wherein the rotatable section is one of the first rotatable pulley, the second rotatable pulley and an idler pulley.

9. The energy harvesting system of claim 8, further comprising a gas flowing through the exhaust pipe, the gas having a temperature greater than or equal to the first temperature.

10. The energy harvesting system of claim 8, further comprising the idler pulley in mechanical communication with the SMA material and configured to receive thermal energy from the SMA material through conduction and to convey a portion of the received thermal energy to the cold region.

11. The energy harvesting system of claim 10, wherein the idler pulley is configured to impart a minimal tension to the SMA material.

12. The energy harvesting system of claim 8, further comprising an electrical generator coupled with at least one of the first rotatable pulley and second rotatable pulley, the electrical generator configured to convert rotational mechanical energy of the pulley into electrical energy.

* * * * *